Patented Jan. 21, 1941

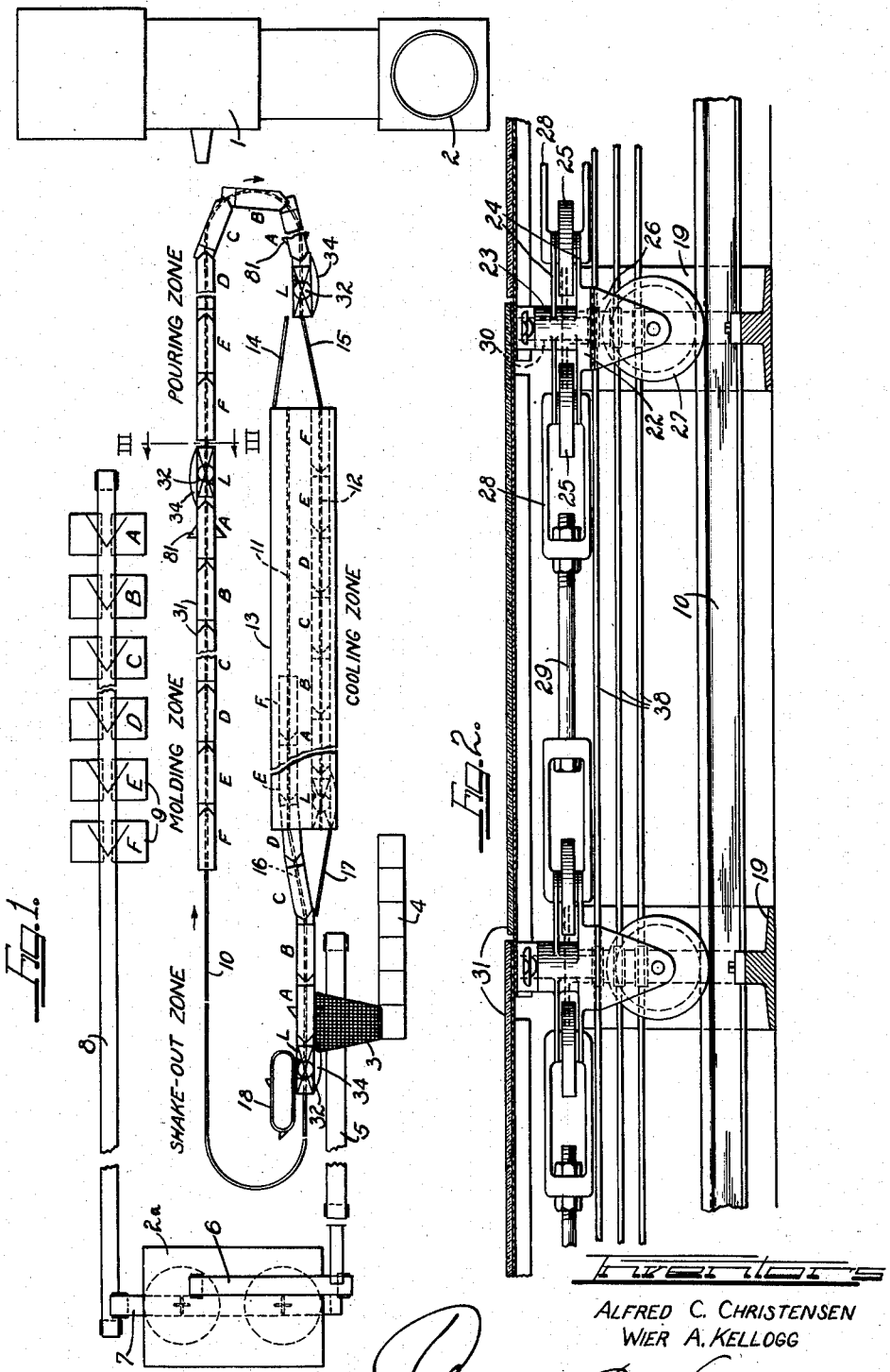

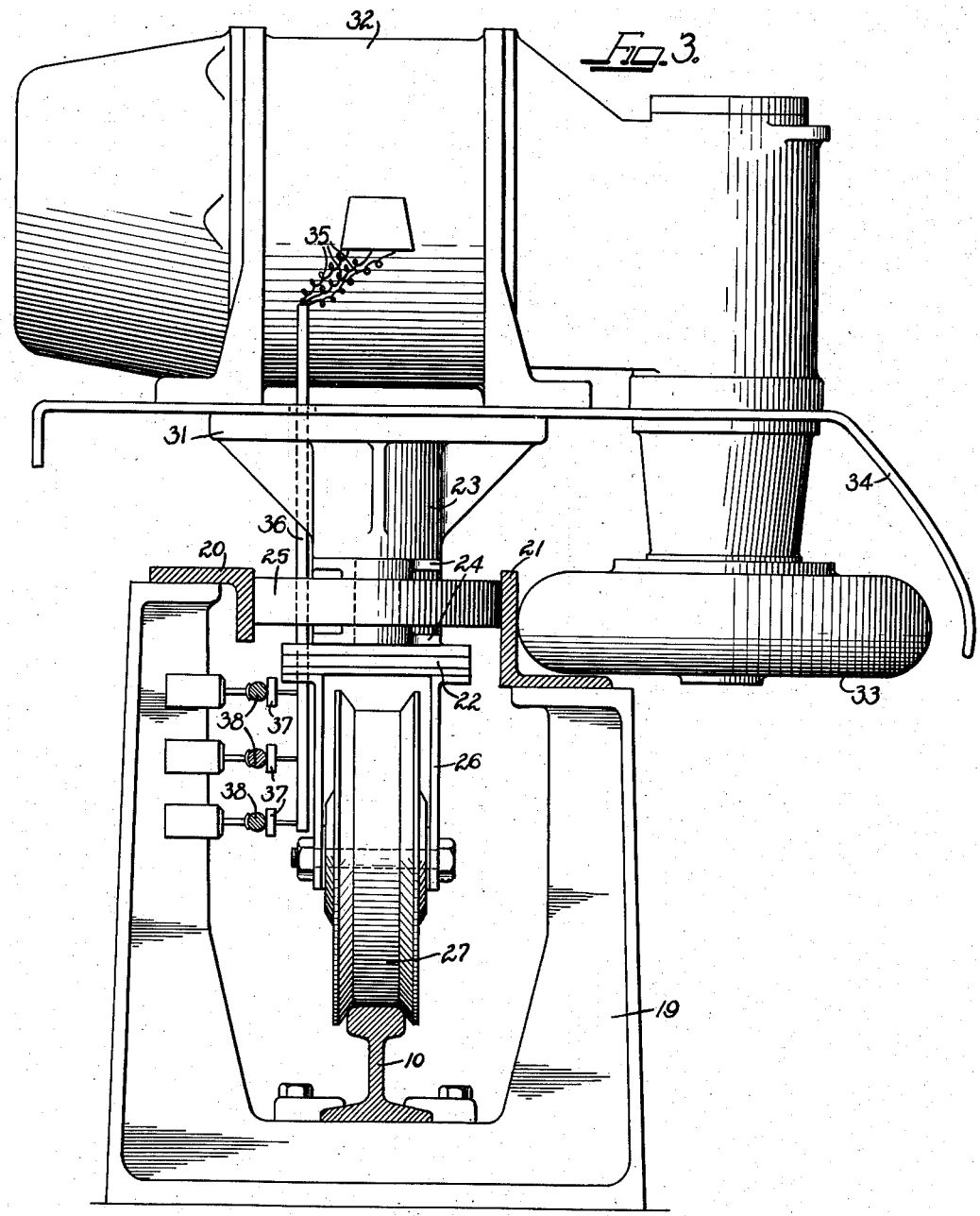

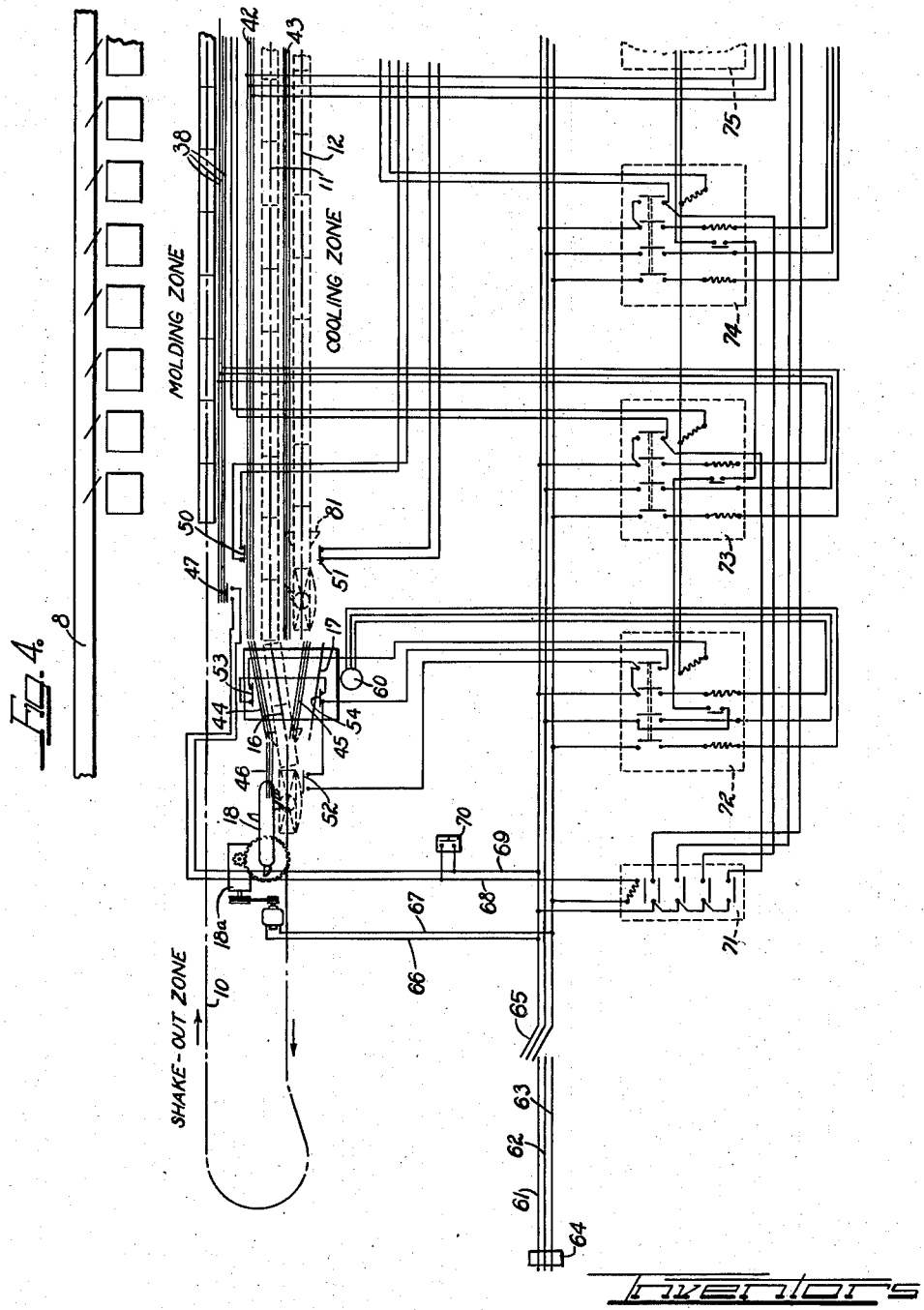

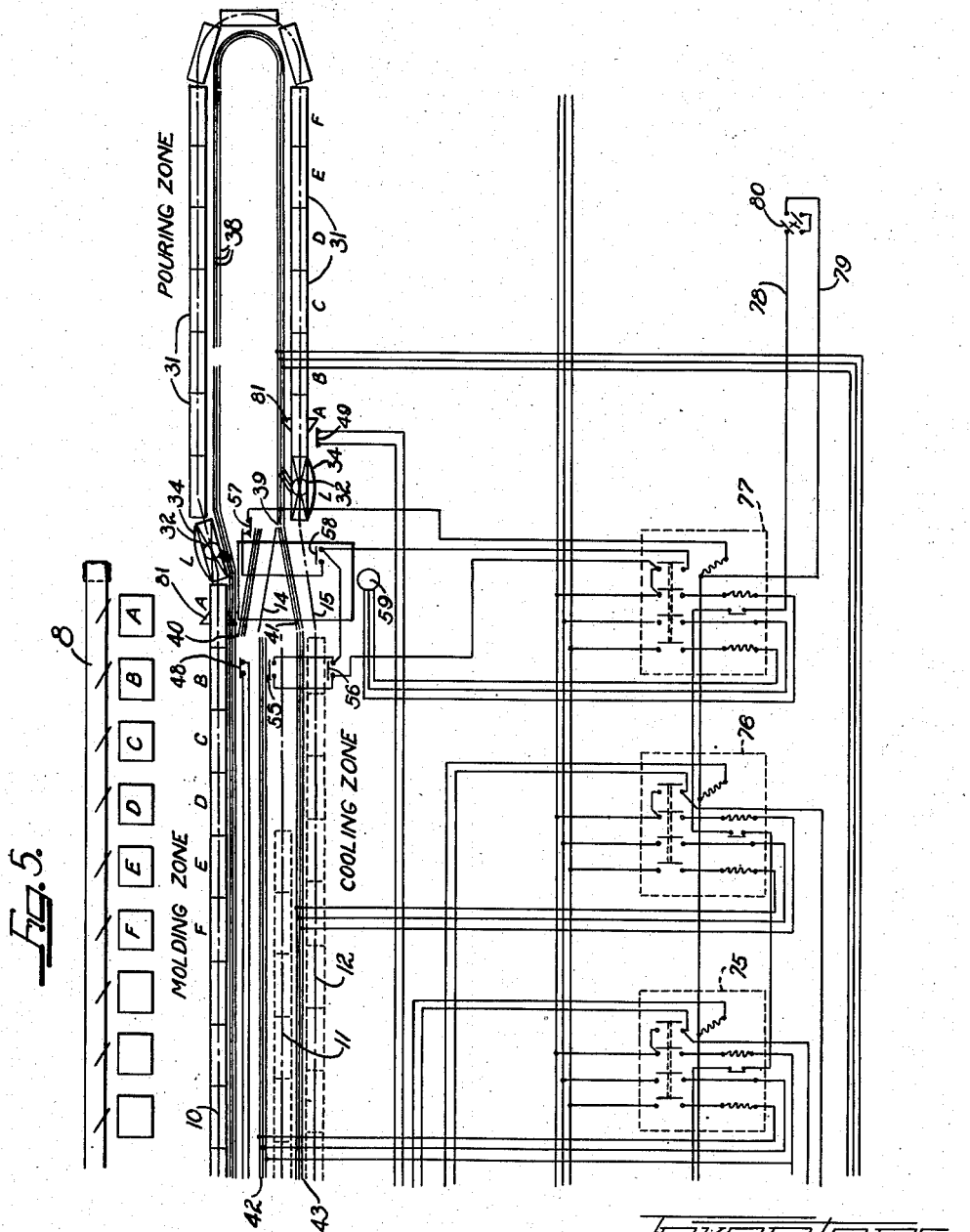

2,229,492

UNITED STATES PATENT OFFICE 2,229,492

MOLD CONVEYER SYSTEM

Alfred C. Christensen, Chicago, Ill., and Wier A. Kellogg, Maplewood, N. J., assignors to Herbert S. Simpson, Chicago, Ill.

Application February 17, 1939, Serial No. 257,024

10 Claims. (Cl. 22—20)

It has been the practice heretofore, in the construction of mold conveying equipment, to provide conveyers for carrying various forms of molds from the forming zone to the pouring zone and then to the cooling and shake-out zones, by means of continuous conveyer mechanisms wherein the mold trays are supported on four-wheel trucks or carriages positioned to run on two-rail tracks. Such types of mold conveyer mechanisms usually move with a rather uneven movement caused by irregularities in the double tracks and in the construction of the trucks or carriages which, in their movement over the tracks, causes shifting, swaying, tilting and other irregular motions which are transmitted to the molds being carried.

Since the molds are usually of the snap-flask type which are formed on bottom boards, the molds are frequently vibrated or jarred to such an extent that the molds are cracked, broken and often entirely destroyed as they are being carried along in their course through the various zones. It has also been found in the past that with continuously moving endless conveyers, the operators in the various zones are often hurried to such an extent that they cannot properly perform the required operations in the allotted time, due to the continuous advancement of the molds and articles being formed therein.

To overcome some of these difficulties heretofore encountered, the present invention has been devised to provide a conveyer system including a substantially continuous one-rail track on which a series of mold conveying trains are intermittently run on the single-rail track in predetermined timed order, through the various operating zones, with a smooth, even movement, obviating shocks or strains to the molds, and furthermore providing a construction wherein the various mold conveyer trains travel intermittently through a predetermined path, allowing sufficient rest periods between the moving of the trains from one zone into another to permit the operators to more efficiently complete the required operations at their respective stations, thereby greatly increasing the efficiency of the entire mold conveyer system.

It is an object of this invention to provide an improved type of mold conveyer system wherein single-wheel locomotives and cars are grouped together in trains to run on a continuous single-rail track, with an intermittent movement which is smooth and easy and which permits the various mold conveying trains to come to rest for predetermined intervals to facilitate the completion of the required operations in the respective zones by the operators at the various stations.

It is also an object of this invention to provide a mold conveyer system wherein the mold conveying mechanisms are arranged in the form of mold conveying trains which are intermittently advanced and stopped for predetermined periods in their travel over a suitable track, permitting the various trains of the system to pass through the various molding, pouring, cooling and shake-out zones forming part of the system.

A further object of the invention is the provision of a mold conveying system including a substantially continuous one-rail track for supporting a series of single-wheel trucks or carriages which are arranged in groups behind electric motor trucks or locomotives provided with suitable electrical and mechanical controls for cooperation with control switches and the like for governing the advancement of the mold conveyer trains through the various zones and for determining the periods of rest of the trains in the various zones for the efficient operation of the system.

Still another important object of the invention is the provision of a mold conveyer system wherein a plurality of trains are adapted to run on a one-rail track governed by a synchronized system of controls, whereby the various trains are intermittently moved and stopped, allowing the mold carrying trains to be stationary when most desired, namely, at the molding and pouring stations or zones, and furthermore providing an arrangement whereby the trains are adapted to be engaged and a.. anced at a reduced continuous speed by a mechanical control arrangement after leaving the cooling zone to advance through a shake-out station or zone at a rate permitting convenient separation of the castings from the material of which the molds are formed.

It is furthermore an object of this invention to provide a mold conveying system wherein a plurality of mold carrying trains are adapted to be moved into and out of molding, pouring and cooling zones at a predetermined rate of speed, with intermittent rest periods in said zones, after which the various trains are adapted to be engaged and advanced by a suitable timing and driving mechanism at a reduced and continuous speed through a shake-out or first zone, after which the cycle of operation is repeated with the train in the shake-out or first zone governing the timing of the movement of the trains into and out of the remaining zones.

It is a further object of this invention to provide a mold conveyer system wherein the mold carrying trucks or cars are adapted to be intermittently advanced at a predetermined speed through a plurality of stations or zones and are then adapted to be continuously advanced, at a reduced rate of speed, through a control or shake-out zone to facilitate the separation of the cast products from the mold sands.

A further object of the invention is the provision of an improved method of molding, including the making and conveying of molds by a plurality of electrically controlled carriers intermittently through a plurality of working zones, and then advancing the carriers consecutively into a control or first zone to be advanced therethrough by an adjustable drive means, whereby the advance of the carriers through said first zone controls the timing of the movements of the carriers through the working zones.

Another object of the invention is the provision of a mold conveyer system wherein the mold carrying units are allowed to remain stationary in the molding zone and later in the pouring zone, to facilitate the formation of the molds and the preservation of the same during critical periods in the system.

An important object of the invention is to provide an improved type of mold conveyer system, of the single-wheel truck type, embodying a plurality of separated trains properly guided over a single rail track for carrying mold trays or cars in a smooth, even manner intermittently through forming, pouring and cooling zones, allowing suitable rest periods in the respective zones for the placing of the molds on the cars and for the pouring of molten metal into the molds, thereby greatly reducing the breaking and destruction of the molds, said system including an arrangement whereby the respective trains are moved by suitable controls at a reduced rate of speed and are advanced continuously through a first shake-out zone, facilitating the separation of the cast articles from the mold sands and eliminating the use of a conveyer between the shake-out zone and the article and sand separating mechanisms of the system.

Another important object of the invention is the provision of a mold conveyer system wherein a plurality of mold trains, including cars and control locomotives are intermittently advanced through a series of zones so that the respective cars of the trains, when the trains are brought to rest in the respective zones, are adapted to register or be indexed with respect to predetermined stations in said zones, thereby providing an arrangement whereby the various molding equipment may always be properly sorted and conveyed to the proper operators at the respective stations in the various zones of the system.

Other and further important objects of this invention will be apparent from the disclosures in the specification and the accompanying drawings.

The invention (in its preferred form) is illustrated in the drawings and hereinafter more fully described.

On the drawings:

Figure 1 is a top plan view, in schematic form, of a mold conveyer system embodying the principles of this invention and including a plurality of intermittently operated mold conveyer trains.

Figure 2 is an enlarged fragmentary side elevation of a sectional portion of the mold conveyer system, showing the track supports and the mold trays in section.

Figure 3 is an enlarged fragmentary transverse section taken on the line III—III of Figure 1, showing one of the train locomotives in position on the track.

Figures 4 and 5 illustrate a schematic form of the mold conveyer system and the wiring diagram for governing the operation thereof.

As shown on the drawings:

The improved mold conveyer system is illustrated schematically in Figure 1 of the drawings, with Figures 2 and 3 illustrating selected types of mechanical features used in the system. The single-wheel types of trucks or carriages forming part of the trains of this invention are similar in construction to those disclosed in the pending application of Alfred C. Christensen and Axel G. Granath for a "Single-wheel mold conveyer," filed April 18, 1938, U. S. Serial No. 202,720.

The mold conveyer system, as illustrated in Figure 1, briefly comprises an air furnace 1 including a stack 2. Located at the opposite end of the system from the air furnace 1 is a sand mixing unit 2a. The molds and castings are received in the control or shake-out zone of the system and are deposited in a shake-out hopper 3 which delivers the castings to a distributing conveyer 4 which carries the castings to suitable points where they may be sorted for further operations. The mold sand from the shake-out hopper 3 is delivered to a conveyer 5 which in turn delivers the sand to a second conveyer 6 for delivery to the sand mixer 2a. The sand, after being properly treated in the foundry mixer 2a, is carried by a transverse conveyer 7 and is delivered to a sand feed conveyer 8 for delivery to the various sand hoppers 9 arranged in a molding zone.

As clearly illustrated in Figure 1, the conveyer system includes a molding zone, a pouring zone, a multiple type cooling zone and a first or shake-out zone. Included in the system are a plurality of train units, four of which are used in the present showing, which are adapted to run on a substantially continuous one-rail track 10. The track 10 is continued through the molding zone, the pouring zone and the shake-out zone, while in the cooling zone there are a plurality of single-rail track sections 11 and 12 which are parallel to one another and are contained in a cooling housing 13.

Positioned between the end of the pouring zone and one end of the cooling zone is a track switch consisting of two track switch sections 14 and 15 so arranged that when the track switch 14 is in register with the cooling track section 11, the other switch track section 15 is out of register with the cooling track section 12. Positioned between the shake-out zone and the opposite end of the cooling zone is a second track switch consisting of a track rail section 16 and a track rail section 17 adapted to respectively register with the cooling track sections 11 and 12 with the shifting of the track switch.

In the present showing of the cooling zone equipment, only two track sections are shown in the housing 13, including an arrangement whereby one loaded train may be left in the cooling housing 13 while the other train is adapted to be advanced out of the cooling housing 13 toward the shake-out zone. If desired, more than two track sections may be provided in the cooling housing if it becomes necessary, in certain cases, to require the loaded trains to remain for longer periods in the cooling zone. The track switches provided at the ends of the cooling zone will, of course, be arranged with the required number of switch track sections to cooperate with the respective number of cooling zone track sections used.

The system includes an indexed arrangement between the cars of each of the trains and the respective positions or stations in the various zones of the conveyer system. As a matter of convenience, the hoppers in the molding zone are lettered A, B, C, D, E and F, and the corresponding cars of each of the trains are also lettered A, B, C, D, E and F, while the locomotive of each of the trains is designated L. As clearly illustrated in Figure 1, it will be noticed that the respective cars of the train in the molding zone are positioned opposite the correspondingly lettered hoppers and similar arrangements are carried out through the various other zones of the system, so that the respective cars of each of the trains stop at the respective stations in the various zones in order hat the work and equipment may be kept track of and properly handled by the respective operators in the working zones.

The various trains comprising the system are each provided with an electric locomotive or truck L for the purpose of intermittently carrying the various trains into and through the molding, pouring and cooling zones by means of selectively positioned electrical control mechanisms indicated in the wiring diagram illustrated in Figures 4 and 5, which will hereinafter be described.

For the purpose of conducting the various trains through the shake-out zone at a reduced continuous speed, a continuous caterpillar drive unit 18 is suitably located, as shown in Figure 1, and is provided with driving teeth or projections arranged at spaced intervals and adapted to be consecutively moved into engagement with portions of the respective trains to advance the trains through the first or shake-out zone and back to the molding zone. The caterpillar or booster drive 18 is mechanically controlled by any suitable means, so that the speed thereof may be veried to control the travel of the trains through the shake-out or control zone, depending upon the type of work which is being done.

The mold conveyer system as more clearly illustrated in detail in Figures 2 and 3, comprises a plurality of track supporting frames 19 which are arranged in spaced relation and on which the single rail track 10 is rigidly supported. Rigidly secured upon the upper end of the supporting frames 19 are guard rails 20 and 21. The mold conveyer train units are of substantially a single wheel type for tracking on the rail track 10. Each of the train units includes a plurality of spaced cars or carriages, each of which consists of a yoke or body 22 formed with an integral upwardly projecting tubular hub or sleeve 23. Integrally formed on each side of the sleeve 23 are oppositely projecting pairs of bearing arms 24, between each pair of which a guide roll 25 is rotatably supported.

The two guide rolls 25 of each of the conveyer cars or carriages are positioned between the guard rails 20 and 21 and track thereon to insure a smooth advance of the trains over the rail 10. Secured rigidly to the bottom of each of the carriage yokes or bodies 22 is a bearing fork 26, between the arms of which a flanged single supporting wheel 27 is journaled. The single wheel 27, as illustrated in Figures 2 and 3, runs on the single rail 10. Pivotally connected to each of the bearing arms 24 is one end of a connecting link 28, whereby the opposite ends of each of the cars are connected to the next car or carriage by means of the take-up connecting bolt 29. Engaged in each of the upright sleeves 23 of each of the cars or carriages is a kingpin 30, the upper end of which projects slightly above the top end of the sleeve 23.

The linked single wheel cars or carriages are adjustably and pivotally connected by means of the links 28 and bolts 29 and provide a suitable support for the mold-carrying upper sections of the mold conveyer trains. The mold carriers comprise a plurality of overlapping tray units 31 similar to the construction of the trays illustrated and described in the aforementioned pending application U. S. Serial No. 202,720.

Each of the locomotive carriages L has mounted thereon an electric motor 32 which is adapted to operate a driving wheel 33 which is horizontally disposed, as illustrated in Figure 3, and tracks on the guide rail 21. Each of the locomotive trucks or carriages is also provided with a guard or shield 34 to shield the locomotive wheel 33. Connected with each of the locomotive motors 32 are three wires 35 which are carried downwardly through a conduit 36 and have the ends thereof connected with three contact shoes 37 which are positioned as illustrated in Figure 3 to slidably contact three bus bars 38 mounted in parallel relation on the track supporting frames 19.

The entire movement of the mold conveying trains through the molding, pouring and cooling zones is controlled by a synchronized system of electrical controls which may be varied to suit the molding cycle. The movement of the trains through the shake-out zone is, however, controlled by a manually or mechanically governed mechanism 18a (Figure 4) connected with the caterpillar drive unit 18 for governing the operation and speed thereof. The train in the first or shake-out zone governs the timing of the movements of the trains in the other zones of the system.

Figures 4 and 5 illustrate the two halves of a schematic form of wiring diagram and electrically controlled mechanism whereby the improved operation of the mold conveyer system may be accomplished.

Referring to the bus bars 38, it will be noted in Figure 4 that they start at the molding zone and continue through said zone, with an interruption near the beginning of the pouring zone. The bus bars then continue through the pouring zone and terminate at a point 39 adjacent the track switch 14—15. The track switch mechanism 14—15 carries a bus bar section 40 adjacent the switch track section 14 and a bus bar section 41 adjacent the switch track section 15, so that when the track switch 14—15 is actuated, the bus bar sections 40 and 41 are also moved into or out of register with the bus bars 38 at the point 39 and into and out of register with the bus bar sections 42 and 43 mounted in the cooling zone.

Associated with the switch track sections 16 and 17 are bus bar sections 44 and 45 which are also movable respectively with the switch track sections 16 and 17 into and out of register with the bus bar sections 42 and 43 respectively. A bus bar section 46, as shown in Figure 4, is provided between the cooling zone and the shake-out zone, whereby the trains from the cooling zone may be caused to be brought into the field of operation of the caterpillar drive unit 18 to be advanced thereby at a reduced rate of speed through the shake-out zone.

Positioned throughout the system are a plurality of limit switches for governing the operation of the mold conveyer train and the track switch mechanisms. Mounted at the beginning of the molding zone adjacent the beginning ends of the bus bars 38 is a relay control limit switch 47 which, as shown in Figure 4, is normally open. Located near the outgoing end of the molding zone adjacent the bus bars 38 is a control limit switch 48, and another control limit switch 49 is located at the outlet end of the pouring zone. Two additional control limit switches 50 and 51 are located near the outlet end of the cooling zone. Associated with the track switch 16—17 are three control limit switches 52, 53 and 54, the switch 52 being normally open while the switches 53 and 54 are normally closed.

Associated with the track switch 14—15 are control limit switches 55, 56, 57 and 58, with the switches 55 and 56 adapted to be normally open while the switches 57 and 58 are normally closed.

An electric motor 59 is associated with the track switch 14—15 and an electric motor 60 is associated with the track switch 16—17 for the purpose of opening and closing said switches.

The control circuit includes a three-line power circuit, including the power lines 61, 62 and 63, which enters through a safety fused switch 64. Provided in the main power lines 61, 62 and 63 is a main control switch 65. Connected with a motor forming part of a driving mechanism 18a for actuating the caterpillar drive 18 are two circuit lines 66 and 67 connected to the main power lines 61 and 63, respectively.

Connected to the terminals of the limit switch 47 are lines 68 and 69, across which a relay control switch 70 is connected. The line 69 is connected to the main line 61, while the line 68 is connected to a main control relay 71 having two terminals thereof connected by suitable lines to the main power lines 61 and 63.

Connected with the switch control motor 60, to the limit switches 52, 53 and 54 and to the three main power lines 61, 62 and 63 by suitable lines is a standard magnetic starter 72. Also connected to the three main power lines 61, 62 and 63, by suitable line wires, are four standard magnetic starter units 73, 74, 75 and 76 which serve as the controls for the respective trucks or locomotives of the four mold conveyer trains of the system.

Three of the terminals of the magnetic starter 73 are connected by suitable lines to the three bus bars 38 at the loading zone. Two other terminals of the magnetic starter 73 are connected by suitable lines to the limit switch 48 near the end of the loading zone.

The locomotive control magnetic starter 74 has three terminals thereof connected by suitable lines to the three bus bars 38 near the end of the pouring zone. Two other terminals of the magnetic starter 74 are connected by suitable lines to the limit switch 49 at the end of the pouring zone.

The magnetic starter 75, in addition to having three of its terminals connected to the respective power lines 61, 62 and 63, has three terminals thereof connected by suitable lines to the three bus bars 42 in the cooling zone. The two remaining terminals of the magnetic starter 75 are connected by suitable lines to the limit switch 50 associated with the pouring zone.

The fourth locomotive control magnetic starter 76, in addition to having three of its terminals connected by lines to the main power lines, has three other terminals connected by suitable lines to the three bus bar sections 43 in the cooling zone. The two remaining terminals of the magnetic starter 76 are connected by suitable lines to the limit switch 51 associated with the outlet end of the cooling zone and the track section 12 thereof.

Connected with the switch control motor 59 are three power lines which are also connected to three terminals of a standard magnetic starter unit 77. The standard magnetic starter 77 also has three terminals thereof connected by suitable lines to the three main power lines 61, 62 and 63. One of the terminals of the limit switch 56 is connected by a suitable line to a terminal of the magnetic starter 77. Connected to another terminal of the magnetic starter 77 is one end of the line, the other end of which is connected to one of the terminals of the limit switch 58. Still another terminal of the magnetic starter 77 is connected by suitable lines to one of the terminals of the limit switch 57.

Connected to the magnetic starter control units 72 to 77, inclusive, by suitable line wires 78 and 79 is an emergency control switch 80 which normally is closed and which may be opened in case of emergency for the purpose of simultaneously stopping the operation of the various mold conveyer trains when necessary.

By means of the improved circuit and the distributed limit switches forming a part thereof, a mold conveyer system is produced wherein a plurality of mold conveying trains, preferably of the guide roller single-wheel car and locomotive type are installed to run on a substantially continuous single-rail track, the cooling zone portion of which may be provided with two or more track sections which may be selectively brought into register with the main track to facilitate the movement of trains from the cooling zone in a predetermined or selected order for advancement into the shake-out zone. The improved mold conveyer system furthermore provides for a controlled indexed movement of the various mold conveyer trains through the molding, pouring and cooling zones at a selected rate of speed after allowing the respective trains to remain stationary in the various zones for predetermined periods of time, during which the more delicate operations in the making of the molds and in the pouring of molten metal therein may be safely and efficiently accomplished.

By providing a separate driving mechanism in the shake-out zone, the improved system permits the various mold conveying trains from the cooling zone to be continuously advanced at a much lower rate of speed than the movement of the trains through the remaining zones, so that the molds and articles therein may be conveniently deposited in the shake-out hopper 3, whereby the molded articles are separated from the molds and are delivered to the conveyer 4 for distribution and for further work thereon. The mold sand from the shake-out hopper 3 is delivered by means of the conveyers 5 and 6 to the sand mixing and mulling machine 2a, from which it is conveyed by the conveyer 7 back to the feed conveyer 8 for re-use in the molding zone.

The improved system also permits of the indexing of the various cars of each of the trains with certain predetermined positions or stations in each of the zones of the system, thereby allowing certain mold equipment and certain types of molds to be delivered or brought to rest at predetermined stations and in the respective fields of operation of selected operators.

For the purpose of facilitating the operation of the system, either the locomotive or selected cars or carriages of each of the train units are provided with suitable actuating dogs or projections 81 which are so positioned that they are brought into engagement with the various limit switches at predetermined times for actuating the same. By arranging a multiple type cooling zone, the mold conveying trains from the pouring zone are permitted to remain in the cooling zone during the next cycle of operations, while a train which previously has entered the cooling zone is advanced out of the cooling zone into the shake-out zone.

To start the conveyer system in operation, the relay control switch 70 is closed, as is also the emergency control switch 80. The main control line switch 65 is now adapted to be closed to energize the power circuit causing operation of the driving unit 18a which in turn actuates the booster or caterpillar drive unit 18, the teeth of which are adapted to be brought into engagement with suitable projections on the locomotives and cars of the respective trains. A loaded train which has been in the cooling zone for a period of rest is thus advanced by the caterpillar drive unit 18 through the shake-out or control zone at a reduced rate of speed which may be varied by mechanical means, if desired, to suit conditions.

When the various cars of a train are brought into register with the shake-out hopper 3, the respective cars are unloaded into the hopper and the molded articles are separated from the sand. When the locomotive or car which carries the limit switch control means reaches the beginning of the molding zone, the respective train is electrically energized, as are also the trains in the loading zone and in the pouring zone, so that the three trains are simultaneously advanced at a predetermined rate of speed into the next respective zone, and the track switches are actuated by the respective switch motors 59 and 60, so that the proper switch track sections are brought into register with the respective cooling zone track sections, allowing the respective train unit from the cooling zone to be advanced into the shake-out zone.

The energizing and de-energizing of the locomotives at predetermined times is accomplished by the arrangement of the bus bars 38 and the bus bar sections 40 to 46, inclusive, so that the proper timed advancement and stopping of the various mold conveyer trains is properly accomplished. It will thus be seen that the improved mold conveyer system is such that the mold conveyer trains are advanced into the respective zones and are allowed to remain in said zones for predetermined periods to facilitate the proper performance of the delicate operations of the molding and pouring systems, and furthermore allowing the proper time for cooling in the multiple type of cooling zone forming part of the system. The system also provides for the continuous movement of the various cooled loaded train units through the shake-out zone at a reduced rate of speed which is very desirable for the proper separation of the molded articles from the sand and for return of the sand to the mixing machine 2a before being returned to the molding zone for re-use.

The conveyer system covers an improved method of molding, including the intermittent advancement of a plurality of mold conveying trains at predetermined speeds into and out of selected zones, allowing suitable rest periods in said zones, with the timing of the movement of the trains being governed by the movement of a train through a control or first zone at a controlled rate of speed which may be varied to suit molding conditions.

While the improved mold conveyer system has been illustrated and described in connection with trains composed of guide roller and single-wheel locomotive and cars for operation on a single-rail track, it will, of course, be understood that the system may be equally adaptable for two or four wheel locomotives and cars which run on double-rail tracks. The various mechanical and electrical control units used in the system may also be varied to suit particular installations.

It will, of course, be understood that many other features of construction may be varied through a wide range without departing from the principles of this invention, and it is, therefore, not the purpose to limit the patent granted hereon otherwise than necessitated by the scope of the appended claims.

We claim as our invention:

1. In a mold conveyer system comprising a track arranged in a continuous path, a plurality of mold working zones arranged around the path of the track, a mold conveying train of less length than the track mounted to run thereon, a main drive means for intermittently running the train at a predetermined speed through a plurality of the working zones, timing means in the working zones and connected with the main drive means, and a manually controlled caterpillar drive means for advancing the train at a reduced rate of speed through a remaining working zone into a position to actuate the timing means to start the operation of the main drive means at a predetermined time to start the movement of the train through the plurality of said working zones.

2. In a mold conveyer system comprising a track arranged in a continuous path, a plurality of mold working zones arranged around the path of the track, a plurality of independent mold conveying trains mounted to run on the track, drive means for simultaneously moving the trains at intermittent periods through selected working zones, control devices connected with the drive means for governing the movement of the trains through said zones, a timing means, and a second drive means for continuously moving the trains through another working zone at a controlled rate of speed into position to operate the timing means to simultaneously start and run the trains through said working zones and into positions to operate the control devices to stop the trains in said working zones until another train from said single working zone operates the timing means.

3. A mold conveyer system comprising a track arranged in a continuous path, a molding zone, a pouring zone, a multiple track cooling zone, and a shake-out zone arranged around the path of said track, a plurality of mold conveying train units supported on said track, control means for intermittently advancing the trains at the same time through the molding zone, the pouring zone and the multiple type cooling zone, and a changeable speed type of drive means in the shake-out zone for continuously advancing the trains at a reduced rate of speed through the shake-out zone and back into the molding zone and controlling the timing of the movement of the trains in the first three zones.

4. A mold conveyer system comprising a molding zone, a pouring zone, a multiple track cooling zone, and a shake-out zone arranged in a continuous path, a main track extending through the shake-out zone, the molding zone and the pouring zone, a plurality of track sections arranged in the cooling zone, track switch units arranged between the ends of the main track and the cooling zone track sections, means for operating the track switch units for bringing a selected cooling zone track section in register with the main track, a plurality of mold conveying trains mounted to run on the main track and the cooling zone track sections, control devices for simultaneously governing the movement of the trains intermittently at a predetermined speed through the molding zone, the pouring zone and the cooling zone and allowing the trains in the cooling zone to remain an extra period of time, a driving unit in the shake-out zone for engaging and advancing the trains through the shake-out zone and back over the main track to the molding zone, and timing means in the molding zone operable by trains from the shake-out zone to govern the operation of said control devices.

5. A conveyer system comprising a main track, a plurality of auxiliary track sections disposed between the ends of the main track, track switch units disposed between the ends of the main track and the ends of the auxiliary track sections, a plurality of train units mounted to run on the main track and on the auxiliary track sections, control mechanisms for simultaneously advancing the train units at predetermined speeds over parts of the main track and over the auxiliary track sections, means for shifting the track switch units for the entry of a train unit onto one of the auxiliary track sections while a train unit on another auxiliary track section is moved therefrom back onto the main track, a drive mechanism for moving the train unit from an auxiliary track section back onto the main track at a rate of speed less than the entrance speed of a train unit onto another of the auxiliary track sections, and a timing device actuated by the train unit when operated by the drive mechanism for timing the operation of said control mechanisms.

6. A mold conveyer system including a molding zone, a pouring zone, a cooling zone, and a shake-out zone, a track system connecting the various zones, a plurality of mold conveyor train units mounted on the track system, a control system governing the movements of the train units on the track system with an intermittent movement providing rest periods of the train units in the molding zone and the pouring zone, and providing a longer period of rest of the train units in the cooling zone, a changeable speed drive mechanism in the shake-out zone for continuously advancing the train units from the cooling zone at a selected rate of speed through the shake-out zone and a timing switch device operable by the train units arriving from the shake-out zone for governing the timing of the simultaneous movement of the train units through the molding, pouring and cooling zones.

7. A mold conveyer system including in combination a molding zone, a pouring zone, a cooling zone, and a shake-out zone, a sand mixing and mulling unit adjacet the shake-out zone, a shake-out hopper unit also adjacent the shake-out zone, sand conveyer mechanisms between the shake-out hopper unit and the sand mixing and mulling unit, conveyer mechanisms between the sand mixing and mulling unit and the molding zone, an air furnace unit adjacent the pouring zone, a track system connecting the various zones, a plurality of train units on the track system, means for advancing the train units through the molding zone, the pouring zone and the cooling zone and allowing predetermined periods of rest in said zones, a variable speed type caterpillar drive mechanism in the shake-out zone for engaging and advancing the train units at a determined speed continuously through the shake-out zone and past the shake-out zone hopper mechanism to receive the molds and the contents thereof from the train units, and a timing device operable by the train units arriving from the shake-out zone for timing the movements of the train units through the molding, pouring, and cooling zones.

8. A mold conveyer system comprising a molding zone, a pouring zone, a cooling zone, and a shake-out zone, a single rail track between said zones, a plurality of single wheel type mold conveyer trains mounted on the single rail track, guides for said trains, means for simultaneously moving the trains over the track intermittently providing predetermined periods of rest in the molding zone, the pouring zone and the cooling zone, a speed change type drive mechanism for continuously advancing the trains through the shake-out zone at a predetermined rate of speed, and a timing device at the entrance end of the molding zone operable by the trains arriving from the shake-out zone for determining the timing of the simultaneous movement of the trains in the molding, pouring and cooling zones.

9. In a conveyer system, a vehicle track separated into a first zone and a second zone, a plurality of electrically propellable vehicles, mechanism for mechanically moving the vehicles successively through the first zone and into the beginning of the second zone, an electric supply circuit, electro-magnetic means selectively operable to closed and opened positions for connecting and disconnecting said electric supply relative to a vehicle in the second zone, means for closing said electro-magnetic means including control contacts operable by said vehicle in response to its reaching the beginning of the second zone, whereupon the vehicle will be electrically propelled, and means for opening said electro-magnetic means including control contacts operable by the vehicle in response to its reaching a predetermined stop position in the second zone, said vehicle remaining at said position until the next following vehicle reaches the beginning of the second zone, whereupon the stopped vehicle is again electrically energized.

10. In a conveyer system, a vehicle track separated into first and second zone paths in series, and an intermediate zone connected between spaced ends of said first and second zone paths and including a plurality of parallel paths, a plurality of electrically propellable vehicles movable in said paths, mechanism for mechanically moving a vehicle through the first zone path and into the beginning of the second zone path, an electric supply circuit, a plurality of electro-magnetic devices selectively operable to opened and closed positions for independently connecting and disconnecting said circuit relative to vehicles in the path of the second and intermediate zones, means for simultaneously closing said devices including control contacts operable by a vehicle in response to its reaching the beginning of the second zone path, whereby vehicles in the second zone path and the intermediate zone path will be electrically propelled, and means for respectively opening said devices including control contacts in each path of the second and intermediate zones operable by a vehicle therein reaching a predetermined stop position, whereby movements of the vehicles from the second zone path to the intermediate zone path, and from the intermediate zone path to the first zone path are timed by the consecutive movements of vehicles from the first zone path into the beginning of the second zone path.

ALFRED C. CHRISTENSEN.
WIER A. KELLOGG.